United States Patent [19]

Withiam

[11] Patent Number: 4,557,916
[45] Date of Patent: Dec. 10, 1985

[54] SYNTHETIC CALCIUM SILICATES AND METHODS OF PREPARATION

[75] Inventor: Michael C. Withiam, Elkton, Md.

[73] Assignee: J. M. Huber Corporation, Locust, N.J.

[21] Appl. No.: 663,955

[22] Filed: Oct. 22, 1984

[51] Int. Cl.$^4$ ............................................. C01B 33/28
[52] U.S. Cl. .................................. 423/328; 423/326; 423/329; 423/331; 423/332
[58] Field of Search ............... 423/326, 328, 329, 331, 423/332

[56] References Cited

U.S. PATENT DOCUMENTS 825,846   7/1906  Lieba ..................................... 106/76
1,201,535 10/1916 Wheeler ................................ 106/76
3,941,871  3/1976 Dwyer et al. ......................... 423/326

FOREIGN PATENT DOCUMENTS 2101110 1/1983 United Kingdom ................ 423/328

*Primary Examiner*—John Doll
*Assistant Examiner*—Jackson Leeds
*Attorney, Agent, or Firm*—Harold H. Flanders; Robert L. Price

[57] ABSTRACT

Alkaline earth metal alumino silicates of the formula:

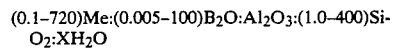

$$(0.1-720)Me:(0.005-100)B_2O:Al_2O_3:(1.0-400)SiO_2:XH_2O$$

wherein Me is an alkaline earth metal, B is an alkali metal, and X is an integer of 1 to 3, are amorphous very high structure absorbents. The products are prepared by reaction of a reactive clay with an alkaline earth metal or hydroxide.

8 Claims, No Drawings

SYNTHETIC CALCIUM SILICATES AND METHODS OF PREPARATION

FIELD OF THE INVENTION

This invention relates to calcium silicates which contain aluminum, methods of preparation from silicates, reactive silicas, and clays, and use of the calcium silicates as absorbent materials.

BACKGROUND OF THE INVENTION

It is known in the prior art to prepare calcium silicates by the reaction of a reactive silica or clay by the addition of silica to a lime suspension in a batch reaction. Calcium silicates are also known to be absorbent materials. See for example U.S. Pat. Nos. 1,574,363 and 3,033,648.

U.S. Pat. No. 1,422,004 to Sherwin discloses a method of recovering sodium aluminate from aluminum containing ore, wherein the ore is reacted with lime at sintering temperatures. Lime and silica are reacted and calcined in the absence of sodium oxide and soluble aluminum in Endres U.S. Pat. No. 1,613,448.

U.S. Pat. No. 2,438,488 to Anderson et al is directed to a process for producing Portland cement wherein aluminum, calcium, sodium, and silica are reacted at sintering temperatures to form calcium alumino silicate intermediates. The intermediates have a CaO to $SiO_2$ molar ratio of 1.9 to 2.0:1.

A pigment prepared by the reaction of an alkaline earth metal silicate and aluminum sulfate in an aqueous medium is disclosed in U.S. Pat. No. 2,786,758 to Taylor. The pigment, which is used in the production of paper, does not contain sodium.

U.S. Pat. No. 2,888,377 to Allen describes the reaction of calcium hydroxide and silica under superatmospheric conditions, in the absence of sodium or soluble aluminum, to produce crystalline calcium silicate pigments useful in the production of paper.

Hydrated calcium silicates formed by the hydrothermal reaction of lime and silica are also disclosed in U.S. Pat. No. 2,995,447 as anti-caking agents or dispersing agents in dried dairy products. According to this patent, the reaction between lime and silica is carried out in the presence of water at an elevated temperature. This product does not appear to contain any other component such as aluminum.

U.S. Pat. No. 3,238,052 to Burak discloses a process for the production of silicates by reaction of a reactive silica, lime, and alumina in an aqueous solution. There were several disadvantages to this process. The aluminum was derived from aluminum sulfate and aluminum alum, both of which contain $SO_4$.

In the present invention, the presence of $SO_4$ has been shown to cause a reduction in the oil absorption property of the resulting pigment. In addition, the silicate product does not contain $Na_2O$, which has been shown by the present invention to produce lower density and higher oil absorbing products.

U.S. Pat. No. 3,264,130 to Mays discloses a process for producing silicate pigments, and the pigments produced therefrom, wherein reactive silicas are reacted with alkaline earth metal hydroxides. While the reactive silicas used in this patent contain alumina, the alumino component is apparently not reactive. Further, $Na_2O$ is not used in the reaction. The resulting pigment therefore has a lower oil absorption proportion than pigments produced from reactions wherein reactive alumina and $Na_2O$ are present. Finally, the pigments of the patent are crystalline or polymorphous in nature. This patent is probably the basis for a product of this type sold by the J. M. Huber Corporation under the trademark NOPAK ® in the 1960's.

U.S. Pat. No. 3,567,667 discloses mould lining compositions which comprise a ball mill dust and calcium silicate or calcium alumino silicate fibrous refractory material. In this patent the calcium silicate and calcium alumino silicate materials are described as being preferably slag wool or a material known as Eldorite.

U.S. Pat. No. 4,243,429 to Tamura et al describes a process for making the mineral tobermorite by reacting a lime and a siliceous material containing alumina in an alkali solution under hydrothermal conditions. The tobermorite has the formula: $5CaO:6SiO_2:5H_2O$, and contains no $Na_2O$ or $Al_2O_3$. Additionally, ettringite, a calcium alumino sulfate, is produced.

The present invention provides an amorphous alkaline earth metal alumino silicate which has use as an absorbent material in many areas.

SUMMARY OF THE INVENTION

It is accordingly one object of the invention to provide a series of novel amorphous calcium silicates which contain aluminum and their methods of preparation.

A further object of the invention is to provide a series of novel alkaline earth metal silicates which contain aluminum which are amorphous in form and which have a very high structure and high oil absorption which makes these materials suitable as absorbents because of their high absorptive capacity.

A still further object of the present invention is to provide novel amorphous calcium silicate materials which contain aluminum and have very high structure and high oil absorption and which are prepared by the reaction of an alkaline earth metal oxide or hydroxide with a reactive silica material and a source of reactive aluminum.

An even further object of the invention is to provide novel calcium silicates which are useful as carriers and absorbents, and novel compositions which contain the calcium silicates.

Other objects and advantages of the present invention will become apparent as the description thereof proceeds.

In satisfaction of the foregoing objects and advantages there is provided by this invention novel amorphous alkaline earth metal silicate materials of the following formula:

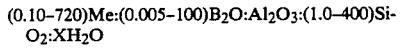

wherein Me is alkaline earth metal, B is an alkali metal, and X is an integer of 1 to 3, the products being useful as absorbents or carriers to form dry liquids in wettable powders, conditioning agents or fillers in paints, rubber and paper, and as grinding aids in chemical waste and disposal.

Also provided by the present invention is a method for the production of the alkaline earth metal silicates of this invention which comprises the reaction of an alkaline earth metal oxide or hydroxide with a reactive form of silica and a reactive form of aluminum under hydrothermal or atmospheric conditions at temperatures ranging from about ambient to 250° C. and pressures ranging from about atmospheric to 400 psi, said reaction being carried out in an aqueous medium.

Also provided by the present invention are paints, rubber and paper containing the amorphous alkaline earth metal silicates of the present invention as conditioning agents, carriers or as fillers, and dry liquids and wettable powders containing an effective amount of the alkaline earth metal silicates of this invention as absorptive agents.

DESCRIPTION OF PREFERRED EMBODIMENTS

As indicated, the present invention provides a series of alkaline earth metal silicates which contain aluminum and are amorphous in form, have very high structures, high oil absorption and are useful as carriers and absorbents in various areas. The products are prepared by the reaction of an alkaline earth metal oxide or hydroxide with a reactive source of silica and a source of reactive aluminum in the presence of an alkali metal oxide. The alkaline earth metal silicates of the invention may be broadly described by the following general formula:

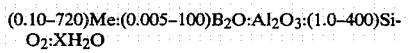
$(0.10–720)\text{Me}:(0.005–100)\text{B}_2\text{O}:\text{Al}_2\text{O}_3:(1.0–400)\text{SiO}_2:X\text{H}_2\text{O}$ wherein in the formula, Me is alkaline earth metal, B is an alkali metal, and X is an integer of 1 to 3. The alkaline earth metal portion of the molecule may be calcium, barium or strontium, but it is preferably calcium since the final products are suitable for many applications and the starting materials are readily available and inexpensive. As indicated in the formula, the product does contain a small amount of one or more alkali metals, preferably sodium, in the form of oxides. The alkali metals are contained in the starting materials or are added separately and remain in the product.

The expression "source of aluminum" means alumina ($\text{Al}_2\text{O}_3$) in any of its reactive forms, and including mixtures and preferably alkali metal aluminates such as sodium aluminate.

The novel compositions of this invention are referred to herein as alkaline earth metal silicates, e.g., calcium silicates. However, since the compositions of the invention also contain aluminum, they may also be referred to as alkaline earth metal aluminosilicates.

While the above represents the broad embodiment of the invention, the following is the preferred embodiment of the invention:

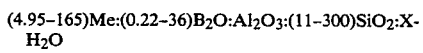
$(4.95–165)\text{Me}:(0.22–36)\text{B}_2\text{O}:\text{Al}_2\text{O}_3:(11–300)\text{SiO}_2:X\text{H}_2\text{O}$ wherein Me and X are as defined above.

The products of the present invention may be characterized as being amorphous, having a very high structure, and as having an oil absorption in the range of 400 to 600 cc/100 g, preferably 550 to 600 cc/100 g, by the Rub Out method. These oil absorption ranges are dependent on the source of reactive silica. A silica that is more reactive produces higher oil absorption products. The addition of reactive aluminum as specified in this invention, will further increase this oil absorption or the oil absorption of products produced from a less reactive source of silica. High oil absorption provides a low density for the products. The products are also characterized as having a surface area in the range of about 100 to 400 m²/g. The pack density ranges from about 0.20 to 0.30 g/ml. The pour density ranges from about 0.1 to 0.2 g/ml. The products also have high brightness ranging from about 70 to 95.

The products of the present invention are prepared by the reaction of a reactive silica with an alkaline earth metal reactant, preferably an alkaline earth metal oxide or hydroxide and a source of aluminum such as sodium aluminate or alumina. The reactive silica material is critical to preparation of the products of the invention. The final properties that can be attained are dependent on the reactivity of the silica. The preferred starting material can be any suitable source of silica including diatomaceous earth, calcined clay, synthetic amorphous silicas or silicates. Preferably the silica is a clay which has been treated with a mineral acid such as sulfuric acid, to produce alum or aluminum sulfate and an insoluble reactive silica called Esellar ®, which is a sulfuric acid leached reactive clay. Esellar ® is a product of this process and is produced by the J. M. Huber Corporation. This reactive silica material is thus a byproduct of the production of alum and is a particularly suitable source as a starting material for the process of the present invention. The leached clay must be filtered and washed to remove residual alum before it can be used in this process. The reactive silica generally contains about 7 to 15 wt. % of $\text{Al}_2\text{O}_3$, about 80 to 90 wt. % of $\text{SiO}_2$, preferably greater than about 85 wt. % of $\text{SiO}_2$, about 5 to 16 wt. % of water and about 5 to 10 wt. % of impurities. (Note: % $\text{SiO}_2$, $\text{Al}_2\text{O}_3$, and impurities are on an anhydrous basis.) The silica is reactive and the presence of the alumina provides a source of unreactive alumina in the starting material to provide the final products of the present invention. The reactive portion of the alumina is provided by sodium aluminate solution. Alkali metal oxide is provided by the sodium aluminate solution, in the case of sodium oxide, and/or caustic solution or other suitable sources of alkali metal oxide.

The reaction is preferably carried out in an aqueous medium and under conditions ranging from atmospheric pressure and temperatures of ambient to 100° C. ranging up to high temperatures and high pressures. The preferred embodiment is to conduct the reaction at atmospheric pressure and temperatures of about 80° to 110° C. Under these conditions the reaction requires reaction times of about 1 to 5 hours. Alternatively, the reaction may be carried out under hydrothermal conditions including pressures of 10 to 400 psi and temperatures as high as 130° to 230° C. More preferred conditions, however, include pressure of 100 to 150 psi and temperatures of 175° to 190° C.

In the preferred embodiment it is preferred to initially prepare a freshly slaked lime ($\text{Ca(OH)}_2$) and add this lime composition to a slurry of the reactive silica. A portion of the aluminum may be present in the silica, the remainder may be added following the addition of the metal oxide slurry in the form of sodium aluminate which will of course also provide sodium as sodium oxide in the mixture. Additional alkali metal oxide may be added as caustic solution. This is the preferred order of addition of reactants. In the reacting composition, the batch composition range on a molar basis is as follows:

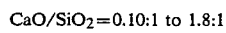
$\text{CaO}/\text{SiO}_2 = 0.10:1 \text{ to } 1.8:1$

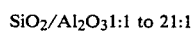
$\text{SiO}_2/\text{Al}_2\text{O}_3 \; 1:1 \text{ to } 21:1$

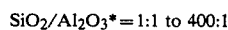
$\text{SiO}_2/\text{Al}_2\text{O}_3{}^* = 1:1 \text{ to } 400:1$ $B_2O + Na_2O/SiO_2 = 0.05:1$ to $0.25:1$ The preferred batch composition on a molar basis is as follows:

$CaO/SiO_2 = 0.45:1$ to $0.55:1$ $SiO_2/Al_2O_3 = 1:1$ to $21:1$ $SiO_2/Al_2O_3* = 11:1$ to $240:1$ $B_2O + Na_2O/SiO_2 = 0.08:1$ to $0.12:1$

*capable of reacting.

After completion of the reaction, the solid is separated from the mixture by filtration or centrifugation and washed with water and dried. The product is then in condition for use as an absorbent material.

In a further embodiment of the invention, physical product characteristics may be improved by spray drying to produce a spray dried product using known methods. A spray-dried product of the invention is free flowing, and is especially desirable in many applications.

In a still further embodiment the dried product may be milled to produce a product of very fine particle size. Alternatively, the dried product may be beaded or pelletized by known methods to produce particles of any desired size.

When used as a carrier, an absorbent or filler, the compositions are incorporated as a dried solid in paints, rubber and paper, and in other materials such as agricultural goods, pharmaceuticals and cosmetics by means known to the art.

A particularly preferred area of use for the compositions of the invention is as a carrier or drying agent for oils and chemicals. A preferred composition will contain about 25 to 40 wt. % of the alkaline earth metal silicate and about 60 to 75 wt. % of the oil or chemical. This provides a semi-pasty product with most oils and liquid chemicals. While the physical form of such compositions varies with the characteristics, the alkaline earth metal silicates of the invention will usually absorb sufficient oil at 60 to 75% oil loadings to produce a resulting composition which is a dry, flowable powder. Thus the compositions of the invention have outstanding characteristics as carriers, absorbents, and drying agents.

The following examples are presented to illustrate the invention but it is not considered as limited thereto. In the examples and throughout the specification, parts are by weight unless otherwise indicated.

EXAMPLE 1

In this example, Esellar ® is the silica source. A batch composition with alumina addition is prepared by adding 239.63 grams of a slurry of freshly slaked calcium hydroxide of the composition 13.61 wt. % CaO, to 1236.47 grams of an acid leached clay slurry containing 5.65 wt. % $SiO_2$ and 0.50 wt. % residual $Al_2O_3$. To the resulting slurry are added 24.25 grams of reactive sodium aluminate solution having a composition of 33.28% $Na_2O$ and 6.80% $Al_2O_3$. The slurry is then reacted at 175° C. at a pressure of 100 psi for 2.0 hours. The batch composition of this mixture on a molar basis is as follows:

$CaO/SiO_2 = 0.5:1$ $SiO_2/Al_2O_3 = 15.0:1$ $SiO_2/Al_2O_3* = 72.0:1$ $Na_2O/SiO_2 = 0.11:1$ $H_2O/CaO = 130:00:1$

*capable of reacting.

On completion of the reaction, the solid is filtered, washed with water and dried. The resulting product exhibited an oil absorption of 574 cc/100 grams.

EXAMPLE 2

This example illustrates a calcium silicate prepared from a source of silica other than Esellar ® and at atmospheric conditions. The silica source is a precipitated silica.

A batch composition with alumina addition is prepared by adding 113.72 g of a slurry of freshly slaked lime ($Ca(OH)_2$) of the composition 12.25 wt. % CaO, to 760.78 g of a reactive silica slurry containing 3.92 wt. % $SiO_2$. To the resulting slurry is added 7.88 g of sodium aluminate solution having a composition of 18.7% $Na_2O$ and 24.2% $Al_2O_3$. The slurry is then reacted at 100° C. for 2.0 hours. The batch composition of this mixture on a molar basis is as follows:

$CaO/SiO_2 = 0.5:1$ $SiO_2/Al_2O_3 = 25.5:1$ $SiO_2/Al_2O_3* = 25.5:1$ $Na_2O/SiO_2 = 0.05:1$ $H_2O/CaO = 187.0:1$

*capable of reacting.

On completion of the reaction, the solid is filtered, washed with water and dried. The resulting product exhibited an oil absorption of 545 cc/100 grams.

The following examples (3 through 5) illustrate the detrimental effect of aluminum sulfate addition and illustrate the positive effect of reactive aluminum addition on the reaction. A precipitated silica is the silica source.

EXAMPLE 3

A reference batch with no alumina or sodium oxide addition is prepared by adding 156.02 g of a slurry of freshly slaked lime ($Ca(OH)_2$) of the composition 13.47 wt. % CaO, to 782.82 g of a reactive silica slurry containing 5.75 wt. % $SiO_2$. The slurry is then reacted at 100° C. for 2.0 hours. The batch composition of this mixture on a molar basis is as follows:

$CaO/SiO_2 = 0.5:1$ $SiO_2/Al_2O_3 = $ Not Applicable $SiO_2/Al_2O_3* = $ Not Applicable $Na_2O/SiO_2 = $ Not Applicable $H_2O/CaO = 129.0:1$

*capable of reacting.

On completion of the reaction the material is handled as outlined in example 2. The resulting pigment exhibited an oil absorption of 500 cc/100 grams.

EXAMPLE 4

This example illustrates the loss in oil absorption, compared with the reference (Example 3), when using alum as an alumina source. In reference to disclosures in U.S. Pat. No. 3,264,130 (Mays) and U.S. Pat. No. 3,238,052 (Burak), the following example illustrates the loss in product properties when the source of alumina is aluminum sulfate. A batch composition with alum addition is prepared by adding 156.02 g of a slurry of freshly slaked lime of the composition 13.47 wt. % CaO, to 772.82 g of a reactive silica slurry containing 5.83 wt. % $SiO_2$, added as precipitated silica. To the resulting slurry are added 19.80 g of aluminum sulfate solution containing 6.07% $Al_2O_3$, followed by 12.01 g caustic solution containing 38.75% $Na_2O$. The slurry is then reacted at 100° C. for 2 hours. The batch composition of the mixture on a molar basis is as follows:

$CaO/SiO_2 = 0.5:1$ $SiO_2/Al_2O_3 = 63.7:1$ $SiO_2/Al_2O_3{}^* = 63.1:1$ $Na_2O/SiO_2 = 0.10:1$ $H_2O/CaO = 132.0:1$

*illustrated to be detrimental to the product. Not capable of reacting in the manner outlined by this patent.

The resulting product exhibited an oil absorption of 474 cc/100 grams.

EXAMPLE 5

The following illustrates the increase in oil absorption due to the addition of sodium and aluminum, when compared with Example 3. Precipitated silica is the silica source.

A batch composition with alumina addition is prepared by adding 156.02 g freshly slaked lime slurry of the composition 13.47 wt. % CaO, to 782.82 g of a reactive silica slurry containing 5.75 wt. % $SiO_2$. To the resulting slurry is added 5.27 g sodium aluminate solution having a composition of 18.7% $Na_2O$ and 24.2% $Al_2O_3$, followed by the addition of 9.47 g caustic solution having a composition of 38.75% $Na_2O$. The resulting slurry is then reacted at 100° C. for 2.0 hours. The batch composition of this mixture on a molar basis is as follows:

$CaO/SiO_2 = 0.5:1$ $SiO_2/Al_2O_3 = 6.01:1$ $SiO_2/Al_2O_3{}^* = 60.1:1$ $Na_2O/SiO_2 = 0.10:1$ $H_2O/CaO = 130.5:1$

*capable of reacting.

The resulting product exhibited an oil absorption of 535 cc/100 grams.

The following examples (6 through 8) illustrate the detrimental effect of aluminum sulfate addition, as well as the effect of reactive aluminum addition. Acid leached clay is used as the silica source in the reference batch.

EXAMPLE 6

A reference batch without alumina or sodium oxide is prepared by adding 145.41 g lime slurry of the composition 13.47 wt. % CaO, to 729.53 g of a reactive silica slurry containing 5.76 wt.% $SiO_2$ and 0.51 wt. % residual $Al_2O_3$. The resulting slurry is then reacted at 100° C. for 2.0 hours. The batch composition of this mixture on a molar basis is as follows:

$CaO/SiO_2 = 0.5:1$ $SiO_2/Al_2O_3 = 19.0:1$ $SiO_2/Al_2O_3{}^* = $ Not Applicable $Na_2O/SiO_2 = $ Not Applicable $H_2O/CaO = 128.29:1$

*capable of reacting.

On completion of the reaction the solid is filtered and dried. The resulting product exhibited an oil absorption of 455 cc/100 grams.

EXAMPLE 7

The following is a standard example of acid leached clay, lime, alumina and caustic, that illustrates this invention. An increase in oil absorption is observed as compared with Example 6.

A batch composition with alumina addition is prepared by adding 145.41 g lime slurry of the composition 13.47 wt. % CaO, to 725.77 g of a reactive silica slurry containing 5.79 wt. % $SiO_2$ and 0.52 wt. % residual $Al_2O_3$. To the resulting slurry are added 2.95 g of sodium aluminate solution having a composition of 18.7% $Na_2O$ and 24.2% $Al_2O_3$, followed by 10.91 g of caustic solution containing 38.75% $Na_2O$. The resulting slurry is then reacted at 100° C. for 2.0 hours. The batch composition of this mixture on a molar basis is as follows:

$CaO/SiO_2 = 0.5:1$ $SiO_2/Al_2O_3 = 16.0:1$ $SiO_2/Al_2O_3{}^* = 100.0:1$ $Na_2O/SiO_2 = 0.1:1$ $H_2O/CaO = 129:1$

*capable of reacting.

The resulting product exhibited an oil absorption of 516 cc/100 grams.

EXAMPLE 8

This example illustrates the loss in oil absorption, compared with the reference (Example 6), when using alum as an aluminum source.

In reference to disclosures in U.S. Pat. No. 3,264,130 (Mays) and U.S. Pat. No. 3,238,052 (Burak), where the use of aluminum sulfate is illustrated, a batch composition, with alumina being supplied by aluminum sulfate solution, is prepared by adding 145.41 g of lime slurry composition 13.47 wt. % CaO is added to 725.77 g of a reactive silica slurry containing 5.79 wt. % $SiO_2$ and 0.52 wt. % residual $Al_2O_3$. To the resulting slurry are added 12.32 g of aluminum sulfate solution having a composition of 6.07% $Al_2O_3$, followed by 12.32 g of caustic solution containing 38.75% $Na_2O$. The resulting slurry is then reacted at 100° C. for 2 hours. The batch composition of this mixture on a molar basis is as follows:

$CaO/SiO_2 = 0.6:1$ $SiO_2/Al_2O_3 = 16.0:1$ $SiO_2/Al_2O_3* = 100.0:1$ $Na_2O/SiO_2 = 0.10:1$ $H_2O/CaO = 130.6:1$

*illustrated to be detrimental to the product. Not capable of reacting in the manner outlined by this patent.

The resulting product exhibited an oil absorption of 362 cc/100 grams.

EXAMPLE 9

This illustrates the substitution of KOH for the additional caustic used with the sodium aluminate.

A batch composition similar to Example 5 is prepared by adding 156.02 g of lime slurry of the composition 13.47 wt. % CaO, to 782.82 g of a reactive silica slurry containing 5.75 wt. % $SiO_2$. To the resulting slurry are added 5.27 g sodium aluminate solution having a composition of 18.7% $Na_2O$ and 24.2% $Al_2O_3$, followed by 11.25 g (caustic potash) KOH solution containing 38.4% $K_2O$. The resulting slurry is then reacted at 100° C. for 2.0 hours. The batch composition of this mixture on a molar basis is as follows:

$CaO/SiO_2 = 0.5:1$ $SiO_2/Al_2O_3 = 60.0:1$ $SiO_2/Al_2O_3* = 60.0:1$ $(K_2O + Na_2O)/SiO_2 = 0.08:1$ $H_2O/CaO = 130.7:1$

*capable of reacting.

The resulting product exhibited an oil absorption of 487 cc/100 grams.

EXAMPLE 10

This example illustrates the substitution of potassium aluminate for sodium aluminate and KOH for the additional caustic.

A batch composition is prepared by adding 156.02 g lime slurry of the composition 13.47 wt. % CaO, to 782.82 g of a reactive silica slurry containing 5.75 wt. % $SiO_2$. To the resulting slurry is added 8.45 g of potassium aluminate solution of the composition 24.3% $K_2O$ and 17.3% $Al_2O_3$, followed by 13.75 g of KOH solution containing 38.4% $K_2O$. The resulting slurry is then reacted at 100° C. for 2.0 hours. The batch composition of this mixture on a molar basis is as follows:

$CaO/SiO_2 = 0.5:1$ $SiO_2/Al_2O_3 = 51.9:1$ $SiO_2/Al_2O_3* = 51.9:1$ $K_2O/SiO_2 = 0.11:1$ $H_2O/CaO = 131.2:1$

*capable of reacting.

The resulting product exhibited an oil absorption of 505 cc/100 grams.

EXAMPLE 11

The calcium silicate products of the present invention compare favorably with commercial products known as Micro-Cel E ® and Micro-Cel C ®. These products are the products described in U.S. Pat. Nos. 3,033,648 and 2,995,447 discussed above. To compare the products of the present invention, samples of Micro-Cell E ® were obtained and tested using the testing procedures of the present invention. There was some variance with these testing procedures from the published data on the characteristics of Micro-Cel E ®. Set forth herein in the table below is a comparison of the products of Examples 1 and 2 with applicant's assignee's results for testing of Micro-Cel E ®, together with the published results of Micro-Cel E ® and Micro-Cel C ®. Micro-Cel E ® and Micro-Cel C ® are trademarks of the Manville Corporation for a line of absorbents and conditioners. These products were characterized with respect to brightness, oil absorption, water absorption, surface area, average particle size, screen residue, pour density, pack density, bulk density and pH. The results are set forth in the following table.

TABLE

| PROPERTY | TYPICAL PROPERTIES | | | | |
|---|---|---|---|---|---|
| | EXAMPLE ACID LEACHED CLAY | EXAMPLE PRECIPITATED SILICA | MICRO-CEL E APPLICANT TESTING | MANVILLE, MICRO-CEL E PUBLISHED | MANVILLE, MICRO-CEL C PUBLISHED |
| Brightness | 83.1 | 94.0 | 64.4 | 60 | 88 |
| Oil Absorption, cc/100 g | 450 | 540 | 296 | 490 (weight %) | 380 |
| Water Absorption, cc/g | 1.80 | 1.36 | 1.79 | 580 (weight %) | 425 |
| Surface Area, m²g | 210 | 185 | 99 | 95 | 175 |
| Average Particle Size, μm | 7.5 | 7.5 | 8.7 | 11.5 | |
| 325 Screen Residue, weight % | 0.4 | 0.6 | 6.9 | 7.0 | 4.0 |
| Pour Density, g/ml | 0.12 | 0.10 | 0.10 | | |
| Pack Density, g/ml | 0.26 | 0.14 | 0.172 | | |
| Bulk Density, g/ml | — | — | — | 0.085 | 0.131 |
| (5%) pH | 10.9 | 10.9 | 8.8 | 8.4 (10%) | 9.8 (10%) |

As will be apparent from the results of the above table, the products of the present invention exhibit characteristics equal to or superior to the commercial product Micro-Cel E ® which is a calcium silicate product. In particular, the products of this invention are characterized by substantially improved brightness and surface area as compared to the products of the prior art.

In this specification, the oil absorption was determined by the ASTM Rub-Out method (Amer. Soc. Test. Mater. Stand., D. 281). This test is based on the principle of mixing linseed oil with a pigment by rubbing with a spatula on a smooth surface until a stiff putty-like paste is formed. By measuring the quantity of oil required to produce a very stiff, putty-like paste, which will not break or separate when it is cut with the spatula, one can measure the oil absorption of pigments—a value which represents the volume of oil required per unit weight of pigment to saturate the pigments absorptive capacity. The oil absorption value is calculated by the following equation:

$$\text{Oil Absorption} = \frac{\text{ml oil absorption} \times 100}{\text{weight of pigment sample, gram}} = \text{ml oil}/100\text{ g pigment}$$

Surface area was determined by the nitrogen absorption method of Brunauer, Emmett and Teller (BET), J.A.C.S., 60, 309 (1938). The average particle size (secondary particle size) was determine by the Coulter Counter method using Model TA II.

The invention has been described with reference to certain preferred embodiments. However, as obvious variations thereon will become apparent to those skilled in the art, the invention is not to be considered as limited thereto.

I claim:

1. An amorphous alkaline earth metal silicate of the following formula:

(0.10–720)Me:(0.005–100)B$_2$O:Al$_2$O$_3$:(1.0–400)SiO$_2$:XH$_2$O wherein Me an is alkaline earth metal, B is an alkali metal, and X is an integer of 1 to 3.

2. An alkaline earth metal silicate according to claim 1 wherein Me is calcium.

3. A method for the preparation of an amorphous alkaline earth metal silicate of the formula:

(0.10–720)Me:(0.005–100)B$_2$O:Al$_2$O$_3$:(1.0–400)SiO$_2$:XH$_2$O wherein Me an alkaline earth metal, B is an alkali metal, and X is an integer of 1 to 3, which comprises adding an alkaline earth metal hydroxide or oxide to an aqueous medium of a reactive silica and an alumina to produce a batch composition containing ratios of reactants on a molar basis of alkaline earth metal oxide to SiO$_2$ of 0.10:1 to 1.8:1, SiO$_2$ to Al$_2$O$_3$ of 1:1 to 21:1, and SiO$_2$ to Al$_2$O$_3$ of 1:1 lto 400:1, reacting under conditions of pressures ranging from atmospheric to 400 psi and temperatures ranging from ambient to 230° C., and recovering the alkaline earth metal silicate as a solid.

4. A method according to claim 3 wherein the reactive silica contains at least 70% silica.

5. A method according to claim 3 wherein the reactive silica is prepared by the reaction of a silica-containing material and a mineral acid.

6. A method according to claim 3 wherein the reactive silica contains about 7–15 wt. % Al$_2$O$_3$, about 80–90 wt. % SiO$_2$, about 5–16 wt. % water, and about 5–10 wt. % of impurities.

7. A method according to claim 3 wherein the reaction is carried out under hydrothermal conditions, at a pressure of about 10 to 400 psi and a temperature of about 130° to 230° C.

8. A method according to claim 3 wherein the reaction is carried out at a temperature of ambient to 100° C. at atmospheric pressure.

* * * * *